UNITED STATES PATENT OFFICE.

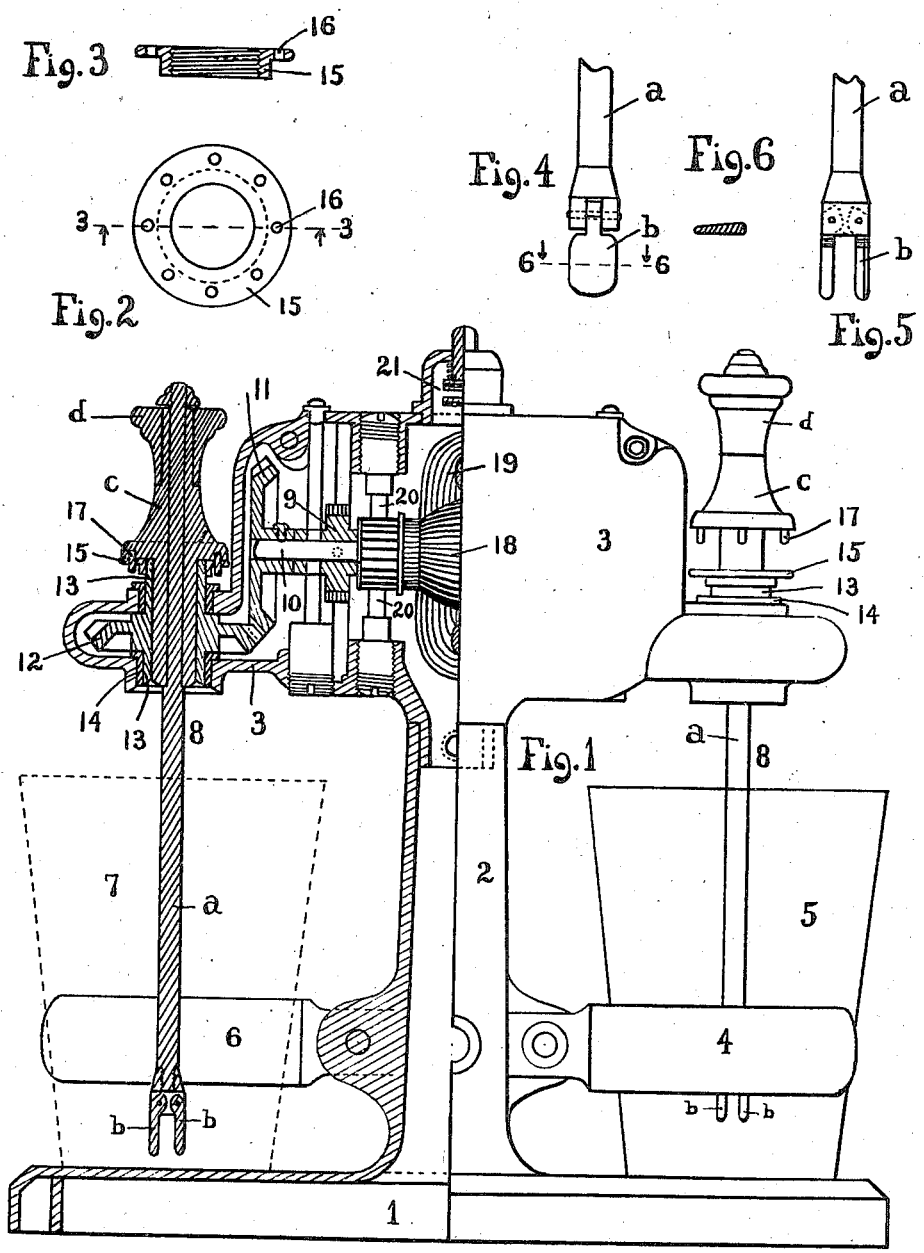

WILLIAM P. ROBERTSON, OF NEW YORK, N. Y.

FOOD AND BEVERAGE MIXING DEVICE.

1,228,823.　　　　　Specification of Letters Patent.　　Patented June 5, 1917.

Application filed August 1, 1916. Serial No. 112,490.

*To all whom it may concern:*

Be it known that I, WILLIAM P. ROBERTSON, a citizen of the United States, and a resident of the borough of Manhattan, city of New York, county and State of New York, have invented new and useful Improvements in Food and Beverage Mixing Devices, of which the following is a specification.

The invention relates generally to food and beverage mixing and beating devices designed to thoroughly mix or agitate flavoring juices and extracts in combination with milk, malted milk, egg, cream or any other liquid or semi-liquid, singly or in combination, whereby the different ingredients will be thoroughly mixed or stirred.

An object of the present invention is to provide a device for this purpose in which a plurality of agitators or mixers can be driven by a single motor, if desired, permitting of several beverages being mixed simultaneously with a minimum of apparatus and power.

According to my invention one receptacle can be positioned at the right hand side of the device and another receptacle at the left hand side of the device and the required agitating elements which are relied upon for thoroughly mixing the ingredients in the receptacles are driven through the medium of suitable gearing from a horizontally-extending shaft that extends from one side of the device to the other. This horizontally-extending shaft is in fact the shaft carrying the revolving armature of a motor.

Another object of the invention is to provide a construction in which the several operating parts are compactly arranged whereby the device as a whole will have a neat appearance and also whereby a cheap but efficient mixing device will result.

Other and further objects of my invention will be apparent from the detail description which follows.

As showing a specific embodiment of the invention reference is made to the drawings forming a part of this specification and in which drawings, Figure 1 is a vertical view partially in section of the new mixing device.

Fig. 2 is a plan view of a notched ring or collar which is employed in the device.

Fig. 3 is a sectional view of the member shown in Fig. 2 and is a view taken as on the plane indicated by the line 3—3 in Fig. 2.

Figs. 4 and 5 are respectively front and side views of the lower portion of the agitating member.

Fig. 6 is a cross-sectional view of one of the agitating elements or tips at the lower end of the agitating member and this is a view taken as on the plane indicated by the line 6—6 in Fig. 4 looking in the direction of the arrows.

The base of the mixing device is designated by 1 and there extends upwardly therefrom a standard or upright member 2. At the upper end of the standard there is carried a housing 3. At the lower portion of the standard there extends to the right on one side thereof a set 4 of expanding metal holders that serve to hold in position a vessel or container 5 wherein the ingredients are mixed or agitated. A similar set 6 of expanding metal holders for holding in position the vessel or container extends to the left from the other side of the standard. These holders serve not only to position the receptacles in place but also to hold them in position while the mixing operation is being performed. The left hand portion of the device is the part shown in section but the right hand side of the device is substantially the same in general features of construction as that shown in the left hand side of the figure, with the exception of the commutator brushes and their connections.

The mixing, agitating or stirring of the ingredients within the vessels or containers, when the latter are in place, is effected through the medium of the agitating members, each indicated by 8, one at the left hand side of the device and the other at the right hand side of the device. Each of these agitating members comprises a shaft, as *a*, having at the lower end thereof agitating elements or tips *b*. There is secured to the upper end of each of the shafts *a* a spool or filler *c* upon which there is mounted a hand-engaging member or handle *d*. The spool or filler *c* and the shaft can revolve relatively to the hand-engaging member or handle *d*, as will be manifest from an inspection of Fig. 1. The housing 3, which is in effect an upper frame, carries a pair of bearings 9, one for each end of the shaft 10 that extends from one side of the device to the other side. As both halves of the device are substantially the same, so far as the gearing arrangement and supporting of the shaft are concerned, a description of one side of the device will be sufficient for the purpose.

The shaft 10, which is a horizontally-extending shaft, carries at each end thereof a bevel gear 11 which may be referred to as the driving gear because it drives another bevel gear, to wit, gear 12, and through the medium of the latter the agitating member 8 which comprises the shaft and agitating tips $b$. This bevel gear 12 revolves about a vertically-extending axis, which is coincident with the axis of the shaft of the agitating member and this gear 12 is often referred to as the open gear because it is provided with a hollow shaft 13 within which one of the agitating members 8 and a portion of the filler $c$ enter. Each gear 12 may be referred to as the driven gear because it is driven by its corresponding coöperating bevel gear 11. It will be observed that the bevel gears 11 are located between the driven bevel gears 12; in other words, each driving gear engages the inner side portion of the gear which it drives, to wit, that portion which is nearest to the motor. The shaft 13 is made hollow to enable the agitating shaft $a$ and the tips $b$ to be withdrawn therefrom. Each agitating shaft $a$ which carries at its lower end the agitating tips $b$ moves vertically and it will be observed that the horizontally extending shaft 10 terminates short of this path thus permitting the vertical movement of each agitating shaft $a$ without any obstruction being encountered by the shaft 10. The hollow shaft 13 is carried in bearings 14 that are in the housing 3. It will therefore be noted that in the mixing device there is a pair of these open or driven gears one of which gears is located at the left hand side of the device for driving the agitating member on that side and the other of which is located at the right hand side of the device for driving the agitating member at the right hand side of the device. There is secured to the upper end of each of the hollow shafts 13 a notched or perforated ring or collar 15, the perforations of which are indicated by the reference character 16. Into these perforations there enter the pins or projections 17 that depend from the underside of the spool or filler $c$. When the pins 17 engage the perforations 16 of the ring or collar 15 the agitating member 8 will be caused to revolve with the open bevel gear 12, if the latter is being revolved. The horizontally-extending shaft 10 heretofore referred to is in fact the shaft of a revolving armature 18 of a motor 19. The revolving armature 18 may be and is properly considered as a driving element that is carried on the shaft 10. This driving element is located between the bearings in which the shaft is carried. This motor has the usual brushes, as 20, and it can be controlled as through the medium of the start and stop switch indicated by 21.

When it is desired to perform a mixing operation a vessel or container as 5 or 7 (the latter being indicated by broken lines) can be positioned in place as by moving it toward the left into the set 4 of expanding metal holders at the right side of the device or by moving it to the right into the set 6 of expanding metal holders at the left hand side of the device. Then the agitating member can be brought into position by lowering it into place where the pins 17 will enter the perforations 16 in the ring or collar 15. This engagement can be effected with the motor running as well as when the motor is still. When the mixing has been performed within a vessel or container the agitating member as a whole can be lifted out of the mixture without disturbing any mixing operation which is being performed on the other side of the device. It will therefore be manifest that a mixing operation can be performed in a vessel or container which is in position at the right hand side of the device independent of the mixing operation which is being performed at the left hand side of the device and vice versa.

It will furthermore be manifest that the invention can be embodied in various forms and modifications without departing from the spirit and scope thereof.

What I claim is:

1. A mixing device of the class described comprising in combination a base carrying an upright or standard, holders extending in opposite directions from said standard for positioning and holding vessels or containers in which a mixing operation is to be performed, a housing carried by said standard at the upper end thereof, a horizontally extending shaft mounted in bearings in said housing, a driving bevel gear on each end of said shaft and driven thereby, a driven bevel gear meshing with each of said driving gears, said driven bevel gears being carried in bearings in said housing, and an agitating member driven by each driven bevel gear, said driving bevel gears being located between the driven bevel gears.

2. A mixing device of the class described comprising in combination a standard having thereupon a housing, a horizontally extending shaft in said housing, bevel gears each revoluble about its vertically extending axis, one of said gears being located in bearings at the right hand side of said housing, the other of said gears being located at the left hand side of said housing, bevel gears carried by the horizontally extending shaft, which last mentioned gears are in mesh with and between the bevel gears that revolve about their vertical axes, and agitating or mixing members driven through the medium of the vertical gears that revolve about their vertically extending axes.

3. A mixing device of the class described comprising in combination a standard, a housing supported by the standard, a motor carried by said housing and having a horizontally extending armature shaft mounted in bearings so that the armature shaft can revolve, the armature winding being on that portion of the shaft which is between said bearings, said housing carrying at the right and left hand sides of the device bevel gears which revolve about their vertically extending axes, bevel gears carried by said armature shaft, one at each end thereof and in mesh with and driving said first-mentioned bevel gears, and a vertically movable agitating member driven by each of said last mentioned gears, each driving bevel gear being located between its corresponding bevel gear and the armature of the motor in such location that the driving bevel gear is in mesh with the inner side portion of the driven gear.

4. A mixing device of the class described comprising in combination an upright or standard, a housing having therein a motor and provided with bearings supporting an armature shaft extending horizontally from the right to the left hand side of the device, a bevel gear mounted on each end of said shaft, a plurality of bevel gears which revolve about their vertically extending axes, one of said gears being carried in bearings at the right hand side of the device the other of said gears being carried in bearings at the left hand side of the device and both of said gears being in mesh with and driven by the bevel gears which are carried on the armature shaft, a driving element carried on that portion of the shaft which is between the bevel gears on the shaft, and agitating members on the lower ends of vertically moving shafts which are driven through the medium of the bevel gears which revolve about the vertically extending axis, the construction being such that the armature shaft terminates short of the path of movement of the vertically movable shafts.

This specification signed and witnessed this 31st day of July, 1916.

WILLIAM P. ROBERTSON.

Signed in the presence of—
  W. C. MARGESON,
  G. McGRANN.